No. 875,419. PATENTED DEC. 31, 1907.
F. FLEISCHMANN.
EGG OPENER.
APPLICATION FILED MAY 16, 1907.

Witnesses:

Inventor
Ferdinand Fleischmann
By
James L. Norris
Atty.

UNITED STATES PATENT OFFICE.

FERDINAND FLEISCHMANN, OF MÖDLING, NEAR VIENNA, AUSTRIA-HUNGARY.

EGG-OPENER.

No. 875,419.   Specification of Letters Patent.   Patented Dec. 31, 1907.

Application filed May 16, 1907. Serial No. 373,941.

*To all whom it may concern:*

Be it known that I, FERDINAND FLEISCHMANN, a subject of the Emperor of Austria-Hungary, residing at Mödling, near Vienna, Austria-Hungary, have invented certain new and useful Improvements in Egg-Openers, of which the following is a specification.

The improved egg opener according to this invention comprises a ring adapted to be laid upon the egg and toothed arcs or knives adapted to be operated by scissor-like handles in such way as to move radially inwards when the handles are pressed together, simultaneously and to the same extent over the entire periphery of the opening of the ring and thereby effect the separation of the cap from the egg in a uniform manner.

The accompanying illustrative drawing shows a constructional form of the improved egg opener in two positions.

Figure 1:
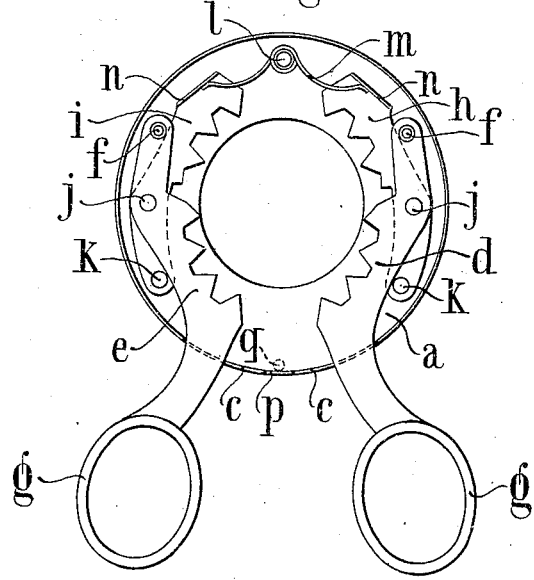
Figure 3:
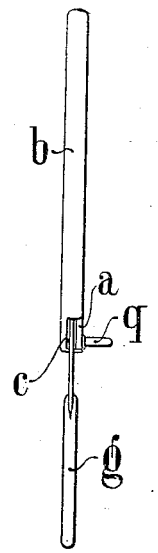
Figure 2:
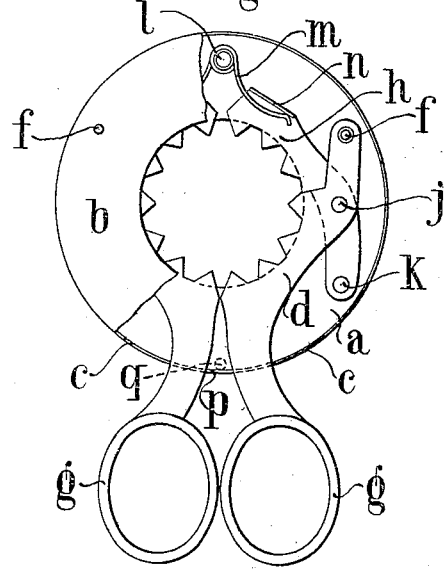

In Figure 1 it is shown with the cover plate removed and out of use, Fig. 2 shows it with the cover plate partially broken away with the cutters in the position they occupy at the completion of an egg opening operation. Fig. 3 is a side view.

The egg opener consists of a two-part, flat annular casing the base plate $a$ of which has a turned up edge while the edge of the cover plate $b$ is likewise turned up and bent over.

The toothed arcs or knives are arranged to move between the base plate $a$ and the cover plate $b$. There are four such toothed arcs or arc shaped knives two of which, viz., $d$ and $e$, Fig. 1, form part of levers which are mounted to rotate about the pivot pins $f, f$ in the casing $a, b$, Fig. 2, and the outer end portions of which are formed as scissor-like handles $g$ each of which projects outwardly through a slot $c$ in the casing. The two other toothed arcs or knives $h$ and $i$, Fig. 1, are mounted to rotate about pins $k, k$ and are each pivotally connected to one of the hand levers at $j, j$ so that through the movement of the hand levers simultaneously with their toothed arcs or knives $d, e$, Fig. 1, the toothed arcs or knives $h, i$ are also moved in the same direction. Each of the two toothed arcs or knives $d, h$ and $e, i$, Fig. 1, pivoted to one another, partially surround the annular opening in the casing $a, b$, Fig. 2, in the form of a semicircle and therefore, when the handles $g$ grasped by the thumb and index finger are pressed together, all four toothed arcs or knives are moved simultaneously and uniformly radially inwards so that the teeth or blades move forward into the opening of the ring through the annular slot left between the base and cover plates of the casing.

In order, when the pressure of the fingers ceases, to move the hand levers and thereby all the toothed arcs or knives back into their initial position in which they are located inside the casing leaving the opening of the ring free, there is arranged in the casing a steel wire spring $m$, which is wound round a pin $l$ in the base plate $a$ and the ends of which bear upon projections $n$ on the toothed arcs $h$ and $i$, Fig. 1.

The edge portions $p$ of the base and cover plate of the casing which separates the slots $c\ c$ of the casing is used for the purpose of limiting the inward movement of the toothed arcs or knives.

To enable the handles of the egg opener to be easily taken hold of when the opener lies out of use upon a flat surface such as a shelf or table, it may be kept in a sloping position so that the handles stand away from the flat surface, by a pin $q$ that projects from the outside of the base plates next the edge part $p$.

Claim.

1. A device of the class described, comprising a base portion having a central opening, two sets of toothed arc-shaped knives pivotally connected to the base on opposite sides of the opening, pivotal connections between the knives of each set whereby they may be moved simultaneously to be either extended beyond or retracted within the edge of the central opening, a spring member operatively connected with one knife of each set for moving said knives to and normally maintaining them in said retracted position, and hand-operable means for moving the knives to said extended position against the action of said spring.

2. A device of the class described, comprising a base portion having a central opening, two sets of toothed curved knives pivotally connected to the base on opposite sides of the opening, pivotal connections between the knives of each set whereby they may be moved simultaneously to be either extended beyond or retracted within the edge of the central opening, a spring member operatively connected with the end knife of each set at one end for moving said knives to and normally maintaining them in said retracted position, and two handles each connected to the knife at the opposite end of each set and extending beyond the base portion in position to be grasped by the hand to move the knives to said extended position against the action of said spring.

In testimony whereof I have hereunto set my hand in presence of two subscribing witnesses.

FERDINAND FLEISCHMANN.

Witnesses:
   JOSEF RUBASCH,
   ROBT. W. HEINGARTNER.